March 2, 1954    A. H. W. ATEN ET AL    2,671,055
PROCESS FOR ELECTRODIALYZING AQUEOUS LIQUIDS
Filed July 29, 1948
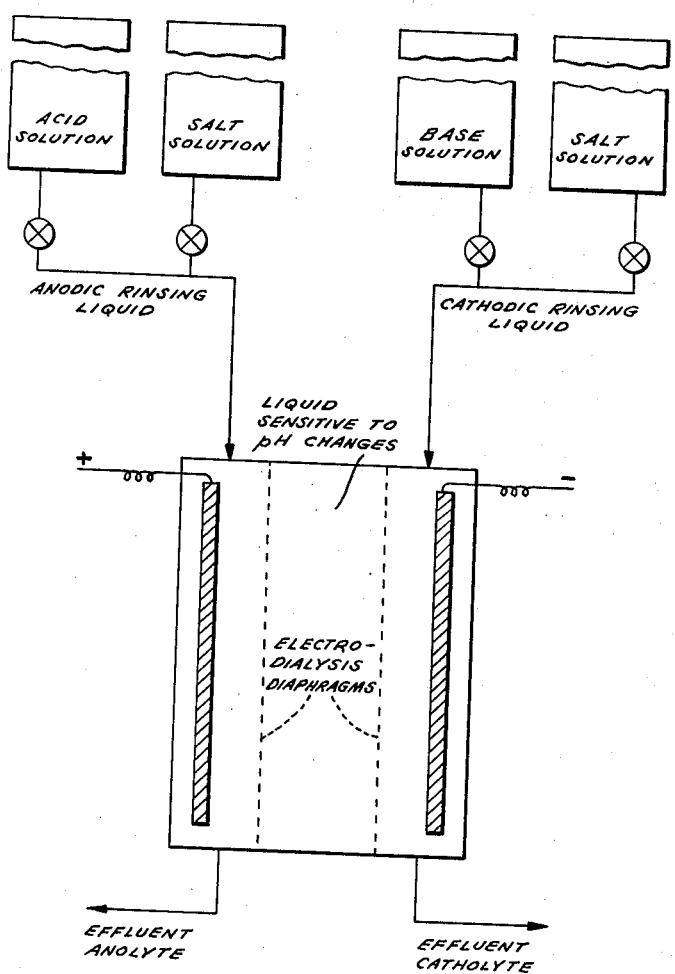
INVENTORS
ADRIAAN HENDRIK WILLEM ATEN
SYBRANDUS GERHARDUS WIECHERS
BY
ATTORNEYS Patented Mar. 2, 1954

2,671,055

UNITED STATES PATENT OFFICE 2,671,055

PROCESS FOR ELECTRODIALYZING AQUEOUS LIQUIDS

Adriaan Hendrik Willem Aten, Hilversum, and Sybrandus Gerhardus Wiechers, The Hague, Netherlands, assignors to de Nederlandsche Centrale Organisatie Voor Toegepast-Natuurwetenschappelijk Onderzoek, The Hague, Netherlands, a corporation of the Netherlands Application July 29, 1948, Serial No. 41,390

Claims priority, application Netherlands March 19, 1948

2 Claims. (Cl. 204—131)

The electrodialysis of aqueous liquids is a method known by itself, which is often applied, mostly on a laboratory scale, in order to reduce the salt content of aqeous liquids. The advantage over the ordinary dialysis is that electrodialysis is much quicker, which is particularly important in the case of liquids subject to deterioration. A disadvantage of the previously known methods for electrodialyzing is, however, that it is very difficult to control the pH of the liquid to be purified or to keep it constant, during the carrying out of the electrodialysis. Depending upon the composition of the liquid to be electrodialyzed and upon the type of diaphragms used, the pH tends to rise or to fall in the course of the electrodialysis. Too big a change of the pH may give rise to undesirable reactions in the liquids to be dialyzed or, in the case of colloidal liquids, to complete or partial flocculation of the colloidal system, which, in addition to being undesirable in itself, results in clogging of the diaphragms or the appearance of undesirable deposits thereon, greatly hampering the passage of the current therethrough. To this end various means have been proposed in the literature to prevent an undesirable change of the pH during the electrodialysis.

Next to the Pauli method which recommends operation at very low current densities in order to prevent undesirable changes of the pH, four methods for opposing this change have become known:

1. Use may be made of the property that various diaphragms acquire a positive or negative charge in the electrolyte solution—and thereby delay the passage of cations or anions, respectively—in order to oppose in this way, by a choice of suitable diaphragms, the tendency of the liquid being electrodialyzed to undergo changes of its pH.

2. Since the presence of polyvalent anions results in a tendency towards reduction of the pH, said tendency may be opposed by the removal, previous to the electrodialysis, of the polyvalent ions, for example by precipitation.

3. In combination with the methods 1 and 2, an alkali or an acid may be added to the liquid to be electrodialyzed, during the latter treatment.

4. In some cases use has been made of the fact that amounts of alkali or acid, respectively, are generated by the electric current on the cathode and on the anode. By the addition of used catholyte to the fresh anode rinsing water and vice versa it is attempted to oppose the tendency of the anolyte or the catholyte, respectively, to become acid or alkaline.

None of the methods indicated above, however, has proved itself completely efficacious in preventing objectionable changes of pH during the electrodialysis. This accounts for the fact that electrodialysis is generally applied only in the laboratory and that application on a large scale in industry has practically not been engendered.

The object of the present invention is to provide a process for electrodialyzing aqueous liquids, in which the concentration of the hydrogen ions of the liquid to be electrodialyzed may be controlled, or kept constant, respectively, during the electrodialysis, which process makes it possible to use electrodialysis on an industrial scale.

It has been found, in fact, that it is possible to control the pH of the liquid to be electrodialyzed, or to keep it constant, respectively, during the electrodialysis, if, quite in contrast with the prevailing opinion that the anode and cathode spaces should be rinsed with water, i. e., tap water or preferably, distilled water, care is taken that the anode is rinsed continuously with liquid which shows a weakly acid reaction or contains a small amount of a salt dissociating in water and that the cathode is rinsed continuously with liquid which shows a weakly alkaline reaction or contains a small amount of a salt dissociating in water. The anode and cathode are immersed in known manner in aqueous liquids held in spaces separated by diaphragms from the electrodialyzing liquid held in an intermediate space, but the respective compositions of the anolyte and the catholyte during the electrodialysis are determined not only by the acid generation and alkali generation normally occurring respectively in the anodic and the cathodic spaces but also by continuously introducing the respective electrolyte-containing rinsing liquids into those spaces and continuously taking off used liquids. Since the anodic acid generation increases the acidity of the influent anodic rinsing liquid, which is at most weakly acid, and the cathodic alkali generation increases the alkalinity of the influent cathodic rinsing liquid, which is at most weakly alkaline, the effluent anolyte and the effluent catholyte are more acid and more alkaline, respectively, than the corresponding influent liquids. The compositions actually effective in the electrode chambers, with respect to migrations of $H^+$ ions and $OH^-$ ions through the diaphragms into the electrodialyzing liquid, thus are dependent upon and can be varied by regulating the flow rates and compositions of the respective influent liquids. It follows that the rates of immigration of $H^+$ and $OH^-$ ions can be controlled so as to keep the pH of the electrodialyzing liquid practically constant, or subject only to desired variations, by regulating the relative flow rates and concentrations of the different influent rinsing liquids. The regulation may be based, for example, upon the pH existing at any moment in the liquid being electrodialyzed. A rise of that pH, if it is to be kept practically constant, will call for either an increase of acidity in the anode chamber or a decrease of alkalinity in the cathode chamber, while a fall of that pH will call for reverse adjustments; and any such adjustment may be effected by simply changing either the electrolyte concentration or the inflow rate of the corresponding rinsing liquid.

In practice, for example, acid and alkali are used in the anodic and the cathodic rinsing liquids, respectively, this in contrast to the fourth method mentioned above. A small amount of a water soluble salt may also be used, for example, in the anodic rinsing liquid. In some cases it is advantageous to use a combination of an acid and a salt. The concentration of such electrolyte in these liquids may be adjusted in such relation to the rinsing rates, for example, that the average electrolytic mobility of the $H^+$ ions and the cation present in the anodic rinsing space and the electrolytic mobility of the $OH^-$ ions in the cathodic rinsing space will be such that equal amounts of $H^+$ ions and of $OH^-$ ions move out of the rinsing spaces through the diaphragms into the electrodialysis space. A correction should be applied to these concentrations for the amounts of acid and alkali generated on the anode and the cathode, respectively, and, if necessary, for any tendency of the electrodialysis liquid to change its pH during the electrodialysis independently of the movement of the $H^+$ and the $OH^-$ ions.

In the process according to the present invention the rinsing rates may vary within a wide range. In general lower velocities of the respective inflowing rinsing liquids should be applied, if the effluent anodic rinsing liquid shows a less acid reaction than needed and the effluent cathodic rinsing liquid a less alkaline reaction. The desired rates are easily controllable by measuring the pH of the liquid to be electrodialyzed during the latter treatment. If the pH of the liquid being dialyzed tends to fall, the rate of inflow of the anodic rinsing liquid should be increased and/or the rate of inflow of the cathodic rinsing liquid should be reduced. It is also possible to change to another composition of the rinsing liquids; thus, in the case that the pH of the liquid being dialyzed tends to fall, less acid may, for example, be used in the anodic rinsing liquids or more alkali in the cathodic rinsing liquid, or more salt in the anodic or less salt in the cathodic rinsing liquids.

Good stirring of the liquid in the middle section is essential in this method of electrodialyzing.

If desired, said method for keeping constant the pH of the liquid to be treated during the electrodialysis may be combined with other previously known methods, such as the method of adding an acid or an alkali to the liquid to be electrodialyzed.

The electrodialysis may be carried out continuously or in batches.

A particular advantage of the present process is, that the addition of electrolyte to the rinsing liquids considerably reduces the electric resistance of the rinsing spaces, causing a reduction of the required tension per cell and conesquently a reduction of the loss of energy by development of heat.

The drawing illustrates diagrammatically a system for practicing the process of this invention.

Example I

Unpurified salted-out pepsin, after having been dissolved in 0.01 n HCl, was subjected to electrodialysis in an apparatus of suitable construction and dimensions, at a current density of 30–40 ma./cm.$^2$, at a pH of about 3, this in order to prevent decline of the activity of the pepsin.

As an anodic rinsing liquid a solution of 0.01 n $H_2SO_4$ and 0.005 n $Na_2SO_4$, and as a cathodic rinsing liquid a combination of 0.02 n NaOH and 0.01 n NaCl was chosen.

The cathodic liquids were prepared as separate solutions and the apparatus is constructed in such a way that the quantities thereof which flow through the cathode space are controlled separately. During the electrodialysis an anodic rinsing rate of 100 litres/hour is applied per apparatus containing 20 litres of electrodialysis liquid, and in the case of the two cathodic liquids the rinsing rates are adjusted each on a basis of 120 litres/hour. After 15 minutes the pH of the liquid in the middle section appears to have changed from 3.0 to 3.5. The rinsing rate of the 0.01 n NaCl is now increased to 180 litres/hour and that of the NaOH to 140 litres/hour. After 30 minutes of electrodialysis the pH appears to have fallen to 3.1.

The rinsing rate of the NaCl solution is now adjusted at 130 litres/hour and that of the NaOH solution is kept at 140 litres/hour, etc. The NaCl content of the dialyzing solution, which originally was about 2.5%, has now fallen to zero in 3 hours. The solution obtained is evaporated and mixed into a product containing 1 part of it to 150 parts of milk sugar. 10 kwh. of electric energy was required per kg. of said mixed product. This relatively high energy consumption is the result of the low pH at which the treatment is carried out. However, this is necessary in order to prevent reduction of the enzyme activity of the pepsin.

Example II

The syrup resulting from sugar production after the first crystallisation of sugar—the so called A-syrup—is subjected to electrodialysis in an apparatus of suitable construction and dimensions at a current density of 30–40 ma./cm.$^2$. The pH of the syrup is kept at about 7.0 by adjustment by way of the rinsing liquids.

As an anodic rinsing liquid a solution of 0.01 n $H_2SO_4$ and 0.02 n $K_2SO_4$ is used and as a cathodic rinsing liquid a solution of 0.01 n KOH. A cathodic rinsing rate of 350 litres/hour is used per apparatus containing 50 litres of electrodialysis liquid and an initial anodic rinsing rate of 600 litres/hour. After 15 minutes the pH of the liquid in the middle section appears to have fallen to 6.7, after which the rinsing rate of the anodic rinsing liquid was adjusted at 800 litres/hour. One continues adjusting in this way, in which at the end of the electrodialysis (after about 2 hours) a rinsing rate of about 350 litres/hour appears to be required in order to keep the pH at 7.0. By further evaporating the electrodialyzed syrup much more sugar crystallizes, of much purer quality than is usually obtainable from the A-syrup without the use of electrodialysis.

We claim:

1. The process of removing electrolyte by electrodialysis from an aqueous liquid sensitive to pH changes, which comprises, while subjecting a body of such liquid during agitation thereof between spaced neutral diaphragms to a difference of electric potential between an anode and a cathode immersed, respectively, in an anolyte and a catholyte at the other sides of said diaphragms, continuously flowing into the anolyte, in at least one weak aqueous solution an acid and an added neutral inorganic salt, thereby supplying into the anolyte $H^+$ ions, other cations and anions in predetermined relative concentrations, continuously flowing into the catholyte a weakly alkaline aqueous electrolyte solution, continuously taking off surplus anolyte and surplus catholyte, and for counteracting a change of the pH of said body changing the rate of said salt inflow so as to change the ratio of the concentration of $H^+$ ions to the concentration of other cations in the anolyte.

2. The process of removing electrolyte by electrodialysis from an aqueous liquid sensitive to pH changes, which comprises, while subjecting a body of such liquid during agitation thereof between spaced neutral diaphragms to a difference of electric potential between an anode and a cathode immersed, respectively, in an anolyte and a catholyte at the other sides of said diaphragms, continuously flowing into the anolyte a weakly acid aqueous electrolyte solution, continuously flowing into the catholyte in at least one weak aqueous solution a base and an added neutral inorganic salt, thereby supplying into the catholyte $OH^-$ ions, other anions and cations in predetermined relative concentrations, continuously taking off surplus anolyte and surplus catholyte, and for counteracting a change of the pH of said body changing the rate of said salt inflow so as to change the ratio of the concentration of $OH^-$ ions to the concentration of other anions in the catholyte.

ADRIAAN H. W. ATEN.
SYBRANDUS G. WIECHERS.

References Cited in the file of this patent

UNITED STATES PATENTS

| Number | Name | Date |
|---|---|---|
| 1,577,660 | Ruppel et al. | Mar. 23, 1926 |
| 1,577,669 | Wolf et al. | Mar. 23, 1926 |
| 1,840,105 | Kean | Jan. 5, 1932 |
| 2,093,770 | Billiter | Sept. 21, 1937 |
| 2,631,100 | Aten et al. | Mar. 10, 1953 |